United States Patent [19]
Kostelec et al.

[11] 3,904,243
[45] Sept. 9, 1975

[54] FIBERGLASS SHELL CONSTRUCTION WITH SCREW ANCHOR INSERTS

[75] Inventors: George A. Kostelec; Richard J. Resch, both of Green Bay, Wis.

[73] Assignee: Krueger Metal Products, Inc., Green Bay, Wis.

[22] Filed: Sept. 23, 1974

[21] Appl. No.: 508,123

[52] U.S. Cl. .......... 297/457; 264/DIG. 53; 297/445; 297/DIG. 2
[51] Int. Cl.² .......................................... A47C 5/12
[58] Field of Search ...... 297/445, DIG. 2, 195, 457; 264/261, DIG. 53, 257, 274, DIG. 81; 85/DIG. 2

[56] References Cited
UNITED STATES PATENTS

| | | | |
|---|---|---|---|
| 1,977,876 | 10/1934 | Groff | 85/DIG. 2 |
| 2,808,875 | 10/1957 | Bargen | 297/DIG. 2 |
| 2,810,922 | 10/1957 | Davis | 85/DIG. 2 |
| 2,903,388 | 9/1959 | Jonke et al. | 264/DIG. 53 |
| 3,025,105 | 3/1962 | Nash | 297/DIG. 2 |
| 3,133,765 | 5/1964 | Kramer | 297/DIG. 2 |
| 3,341,251 | 9/1967 | Costin | 297/DIG. 2 |
| 3,587,181 | 6/1971 | Bernier | 264/274 UX |
| 3,622,200 | 11/1971 | Bird | 297/195 |
| 3,647,260 | 3/1972 | Grant et al. | 297/457 |
| 3,669,496 | 6/1972 | Chisolm | 297/457 X |

FOREIGN PATENTS OR APPLICATIONS

| 1,521,125 | 4/1968 | France | 85/DIG. 2 |
|---|---|---|---|

*Primary Examiner*—James T. McCall
*Attorney, Agent, or Firm*—Henry C. Fuller

[57] ABSTRACT

A fiberglass seat shell construction includes plastic inserts which form screw anchors molded in place in protrusions in the lower surface of the seat shell, which inserts have an aperture for threadably receiving self-threading screws which fasten the leg assembly to the seat shell. The inserts have a shank portion which has hexagonal surfaces to prevent rotation of the insert, an upper flange to prevent withdrawal of the insert from the seat shell, and a lower flange which has a planar surface for clamping engagement with the leg assembly under screw pressure and in which the lower flange has a tapered periphery which provides a lead-in surface for proper positioning of the inserts in mold recesses which form the protrusions.

4 Claims, 4 Drawing Figures

PATENTED SEP 9 1975  3,904,243

FIBERGLASS SHELL CONSTRUCTION WITH SCREW ANCHOR INSERTS

BACKGROUND OF INVENTION

Conventionally thermoset plastic seat shells have either been provided with molded-in-place steel studs or a rubber disc with a threaded insert which is cemented to the shell for the connection between the shell and the leg assembly. Thermoplastic shells have been provided with integral plastic bosses to receive screws. To mold steel studs in place, additional seals are required in the mold. Furthermore, production and assembly of hex nuts or studs takes longer than assembly of legs on the shells with sheet metal screws.

SUMMARY OF INVENTION

The invention provides fiberglass seat shells in which inserts forming screw anchors adapted to receive self-threading screws are molded in place and confined in cavities in bosses or protrusions on the lower surface of the seat shell. Angularly related surfaces on a shank portion prevent rotation of the screw anchors and a laterally-projecting upper flange prevents axial withdrawal of the anchors. A lower laterally-extending flange is provided with a planar lower surface which clamps against the leg assembly and a tapered peripheral surface on the flange provides a lead-in into the mold recesses to accurately position the inserts during molding of the seat shell and also afford withdrawal of the bosses and inserts from the mold. The use of the screw anchors of the invention thus enables use of sheet metal screws for fiberglass seat shells.

Further objects, advantages and features of the invention will become apparent from the following disclosure.

DRAWINGS

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
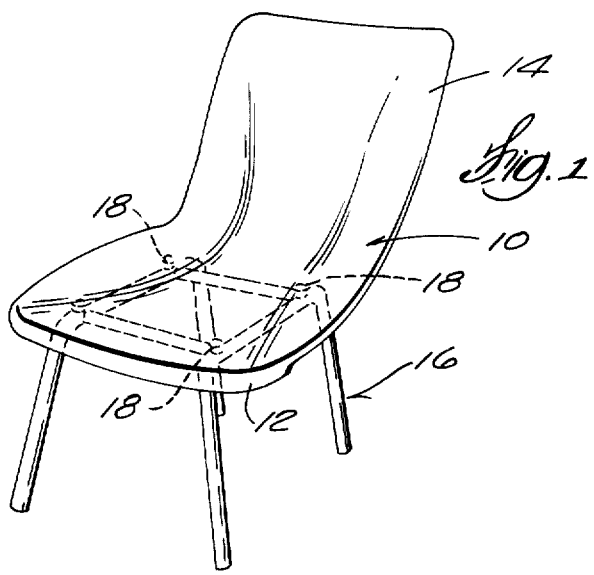
FIG. 1 is a perspective view of a fiberglass seat shell embodying the screw anchors of the invention.
Figure 4:
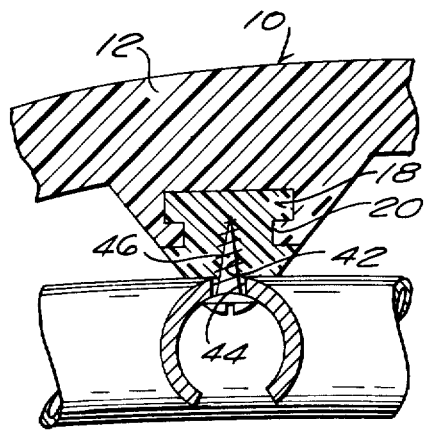
FIG. 4 is a fragmentary sectional view of the inserts, seat shell and leg assembly.

In the drawings, FIG. 1 shows a seat shell 10 with a seat portion 12 and a back rest 14. The seat shell is molded of fiberglass. The seat shell is supported by a leg assembly 16. The leg assembly is secured to the seat shell by screw anchor inserts or fastening elements 18 (FIGS. 3–4) and self-threading screws 20.

Figure 3:
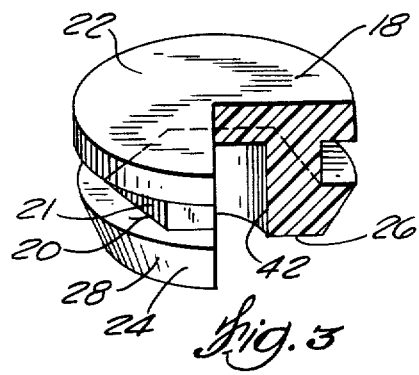
FIG. 3 is an enlarged perspective view in fragmentary section of the anchor inserts of the invention.

The configuration of the fastening elements 18, as best shown in FIG. 3, includes a shank portion 20 with angularly related surfaces 21 to prevent rotation of the insert. As disclosed in FIG. 3, the surfaces are hexagonally related. However, other geometric configurations are also usable if they prevent rotation of the element 18 during assembly of legs and tightening of the leg mounting screws. The fastening element 18 also includes an upper laterally projecting flange 22 which prevents axial withdrawal or displacement of the element 18 during use. A lower laterally projecting flange 24 has a planar clamping surface 26. Flange 24 also has a tapered surface 28 for purposes presently described.

Figure 2:
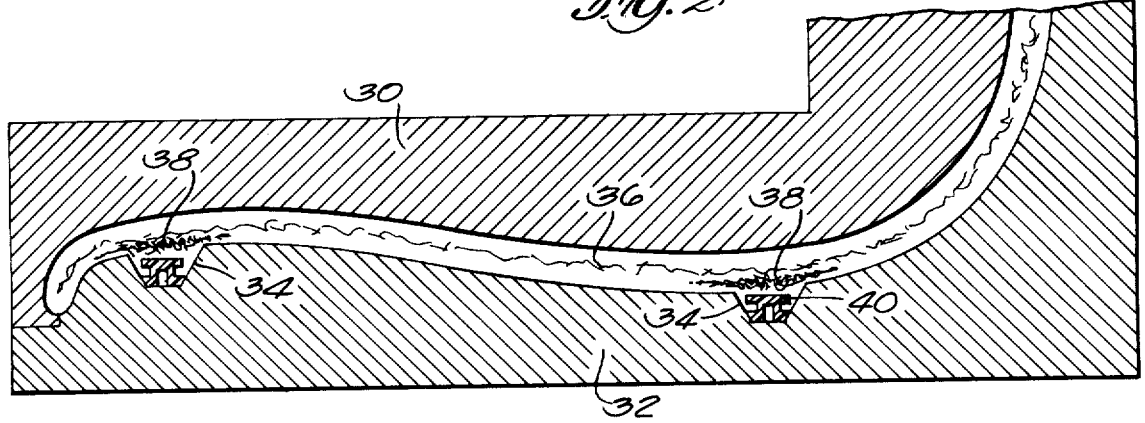
FIG. 2 is an enlarged fragmentary sectional view of the mold assembly and anchors inserted in the mold.

FIG. 2 shows upper and lower mold halves 30 and 32 used in forming the fiberglass seat shell. The mold 32 has recesses or pockets 34 with tapered surfaces having the same angle of taper as the surfaces 28 on the anchors or fastening elements 18. Thus the taper 28 provides a lead-in for the fastening element 18 to positively position the inserts relative to the seat shell. As conventionally molded, the seat shell includes one or more layers of pre-formed fiberglass 36. Loose and randomly oriented fibers are added at 38 surrounding and adjacent the protrusions or bosses 40 in the seat shell to strengthen the protrusions. The tapered surface 28 also affords withdrawal of the seat shell and the anchors 18 from the recesses 34 in the mold portion 32. The anchors are also provided with axial apertures 42 which register with apertures 44 in the leg assembly 16. Self-threading screws 46 are inserted through the apertures 44 during assembly and threaded into the apertures 42 to secure the leg assembly to the seat shell. The anchors or fastening elements 18 are desirably formed from plastic or nylon or other material which is threaded by the screws.

What is claimed is:

1. In a molded fiberglass seat shell construction having a seat portion with a lower surface the improvement comprising a plurality of protrusions on the lower surface of said seat shell, each of said protrusions including cavity fastening elements having an exposed first portion and a second portion confined in said cavities, said fastening elements having a shank portion and upper and lower laterally-extending flanges, said shank portion and said upper flange comprising said second portion confined in said cavity and said lower flange comprising said second portion, and wherein said protrusion and said lower flange have complementary tapered surfaces which decrease in radius toward the lower surface of said lower flange, and an aperture in said fastening elements for receiving screws, and wherein said shank portion has angularly related surfaces to prevent rotation of said fastening elements in said cavities.

2. The improvement of claim 1 wherein said seat shell has an excess of randomly oriented fibers in said shell adjacent to said protrusions.

3. The improvement of claim 1 wherein said tapered surfaces on said protrusions and said tapered surfaces on said lower flanges provide a smooth continuous surface.

4. The improvement of claim 1 in combination with a leg assembly with apertures in said legs registrable with said apertures in said fastening elements and including screws extending through said apertures in said leg assembly and threaded into said fastening elements.

* * * * *